(12) United States Patent
Kawamoto et al.

(10) Patent No.: US 11,568,492 B2
(45) Date of Patent: Jan. 31, 2023

(54) INFORMATION PROCESSING APPARATUS, INFORMATION PROCESSING METHOD, PROGRAM, AND SYSTEM

(71) Applicant: SONY CORPORATION, Tokyo (JP)

(72) Inventors: Kenta Kawamoto, Tokyo (JP); Yoshiyuki Kobayashi, Tokyo (JP); Shingo Takamatsu, Tokyo (JP); Naoki Ide, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/078,340

(22) PCT Filed: Dec. 21, 2016

(86) PCT No.: PCT/JP2016/088252
§ 371 (c)(1),
(2) Date: Aug. 21, 2018

(87) PCT Pub. No.: WO2017/168883
PCT Pub. Date: Oct. 5, 2017

(65) Prior Publication Data
US 2019/0043135 A1 Feb. 7, 2019

(30) Foreign Application Priority Data

Mar. 29, 2016 (JP) .............................. JP2016-066336

(51) Int. Cl.
*G06Q 40/08* (2012.01)
*G06Q 30/08* (2012.01)

(52) U.S. Cl.
CPC ............. *G06Q 40/08* (2013.01); *G06Q 30/08* (2013.01)

(58) Field of Classification Search
CPC .......... G06Q 30/0283; G06Q 30/0645; G06Q 50/30; G06K 9/00838
See application file for complete search history.

(56) References Cited

U.S. PATENT DOCUMENTS 10,032,224 B2 * 7/2018 Helitzer ................. G06Q 40/08
10,373,259 B1 * 8/2019 Konrardy ............... G06Q 40/08
(Continued)

FOREIGN PATENT DOCUMENTS

JP      2001-331652 A    11/2001
JP      2002024625 A     1/2002
(Continued)

OTHER PUBLICATIONS

FinTech' no Shinto de Nanika ga Kawaru? Shisan Un'yo no Mirai, Nikkei Money, Nikkei Business Publications, Inc., Mar. 21, 2016 (Mar. 21, 2016), No. 407, pp. 104 to 105.
(Continued)

*Primary Examiner* — David P Sharvin
(74) *Attorney, Agent, or Firm* — Xsensus LLP

(57) ABSTRACT

[Object] To provide an information processing apparatus, an information processing method, a program, and a system capable of providing a more appropriate vehicle insurance by selecting a vehicle insurance in accordance with a current situation.
[Solution] An information processing apparatus including: a selection section configured to select an insurance to be applied to a vehicle from one or more insurances calculated on a basis of a set vehicle insurance condition, attribute information of the vehicle and a user, and real-time characteristic information of the vehicle which includes movement route information.

17 Claims, 11 Drawing Sheets

(56) References Cited

U.S. PATENT DOCUMENTS

| | | | |
|---|---|---|---|
| 2010/0131300 A1* | 5/2010 | Collopy | G06Q 40/08 701/33.4 |
| 2010/0174566 A1 | 7/2010 | Helitzer | |
| 2012/0123806 A1* | 5/2012 | Schumann, Jr. | G06Q 40/08 705/4 |
| 2013/0304515 A1 | 11/2013 | Gryan et al. | |
| 2014/0257869 A1 | 9/2014 | Binion et al. | |

FOREIGN PATENT DOCUMENTS

| | | | |
|---|---|---|---|
| JP | 2002-259708 | A | 9/2002 |
| JP | 2002358425 | A | 12/2002 |
| JP | 2003006439 | A | 1/2003 |
| JP | 2004078479 | A | 3/2004 |
| JP | 2004171482 | A | 6/2004 |
| JP | 2005275461 | A | 10/2005 |
| JP | 2006099525 | A | 4/2006 |
| JP | 2010-079338 | A | 4/2010 |
| JP | 2011-221579 | A | 11/2011 |
| JP | 2015-087986 | A | 5/2015 |
| JP | 2015087966 | A | 5/2015 |
| JP | 2015215775 | A | 12/2015 |
| WO | 03/065261 | A1 | 8/2003 |

OTHER PUBLICATIONS

A Revolution Infinance Competition in Internet Wealth Management Aug. 31, 2013 Wu Chengpi 284-285.

* cited by examiner

FIG. 6

THE FOLLOWING INSURANCE IS CONTRACTED.

| CONTRACTOR : SONY TARO (00012345) | CAR TYPE : DDD-ZZZZ30 (00654321) |
|---|---|
| DATE AND TIME:2015/8/31 8:00 K-TO N-MACHI DEPARTURE DESTINATION:T-TO M-KU R HILLS WAYPOINT DESIGNATION:NONE ||
| INSURANCE COVERAGE:NO LIMITS ON BODILY INJURY/PROPERTY DAMAGE,PASSENGER INJURY 30 MILLION,NO VEHICLE INSURANCE TERM:2015/8/31 8:00 to 9:00 ||
| INSURANCE PROVIDER:○○ INSURANCE COMPANY ||
| INSURANCE FEE:700 YEN | RATING:A |

INFORMATION PROCESSING APPARATUS, INFORMATION PROCESSING METHOD, PROGRAM, AND SYSTEM

TECHNICAL FIELD

The present disclosure relates to an information processing apparatus, an information processing method, a program, and a system.

BACKGROUND ART

In the society in which automobiles have gained widespread use and a large number of people use automobiles on a daily basis, the convenience of transportation means is improved. Meanwhile, in the case where an accident occurs, the accident has a risk of specially severe danger to human life and body as well as an object in the surroundings. To promote the safety of automobiles, a variety of measures have been taken, but it is difficult to eliminate the risk of accidents. A variety of insurance systems have been thus developed for ampler and more secure compensation for an accident.

Regarding such an insurance system, for example, Patent Literature 1 below proposes a system that detects an operation state of a vehicle by a driver or a use state of a vehicle which means an equipment state or the like of equipment for protecting the body of a passenger, and further calculates an appropriate vehicle insurance fee by taking data regarding the maintenance or management of the vehicle into consideration.

CITATION LIST

Patent Literature

Patent Literature 1: JP 2002-259708A

DISCLOSURE OF INVENTION

Technical Problem

Normally, an automobile insurance is contracted with the content fixed for a relatively long period of time such as one year. However, a car accident incidentally occurs in a specific situation, so that it is difficult to make an accurate prediction or the like about the long-term occurrence probability of accidents or amount of damage when calculating an insurance fee.

In addition, the amount of damage or the like varies to some extent in some cases depending on a prediction method or a prediction maker. It is wholesome to make a market mechanism take charge of the validity of a prediction result, but nothing is proposed about a market system capable of selling or buying a part or the entirety of insurance contracts in real time.

The present disclosure then proposes an information processing apparatus, an information processing method, a program, and a system capable of providing a more appropriate vehicle insurance by selecting a vehicle insurance in accordance with a current situation.

Solution to Problem

According to the present disclosure, there is proposed an information processing apparatus including: a selection section configured to select an insurance to be applied to a vehicle from one or more insurances calculated on a basis of a set vehicle insurance condition, attribute information of the vehicle and a user, and real-time characteristic information of the vehicle which includes movement route information.

According to the present disclosure, there is proposed an information processing method including: selecting, by a processor, an insurance to be applied to a vehicle from one or more insurances calculated on a basis of a set vehicle insurance condition, attribute information of the vehicle and a user, and real-time characteristic information of the vehicle which includes movement route information.

According to the present disclosure, there is proposed a program for a computer to function as: a selection section configured to select an insurance to be applied to a vehicle from one or more insurances calculated on a basis of a set vehicle insurance condition, attribute information of the vehicle and a user, and real-time characteristic information of the vehicle which includes movement route information.

According to the present disclosure, there is proposed an information processing system including: a calculation section configured to calculate an insurance on a basis of a vehicle insurance condition, attribute information of a vehicle and a user, and real-time characteristic information of the vehicle which includes movement route information; and a selection section configured to select an insurance to be applied to the vehicle from the calculated one or more insurances.

Advantageous Effects of Invention

According to the present disclosure as described above, it is possible to provide a more appropriate vehicle insurance by selecting a vehicle insurance in accordance with a current situation.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 6 is a diagram illustrating an example of an insurance presentation screen according to the present embodiment.

MODE(S) FOR CARRYING OUT THE INVENTION

Figure 1:
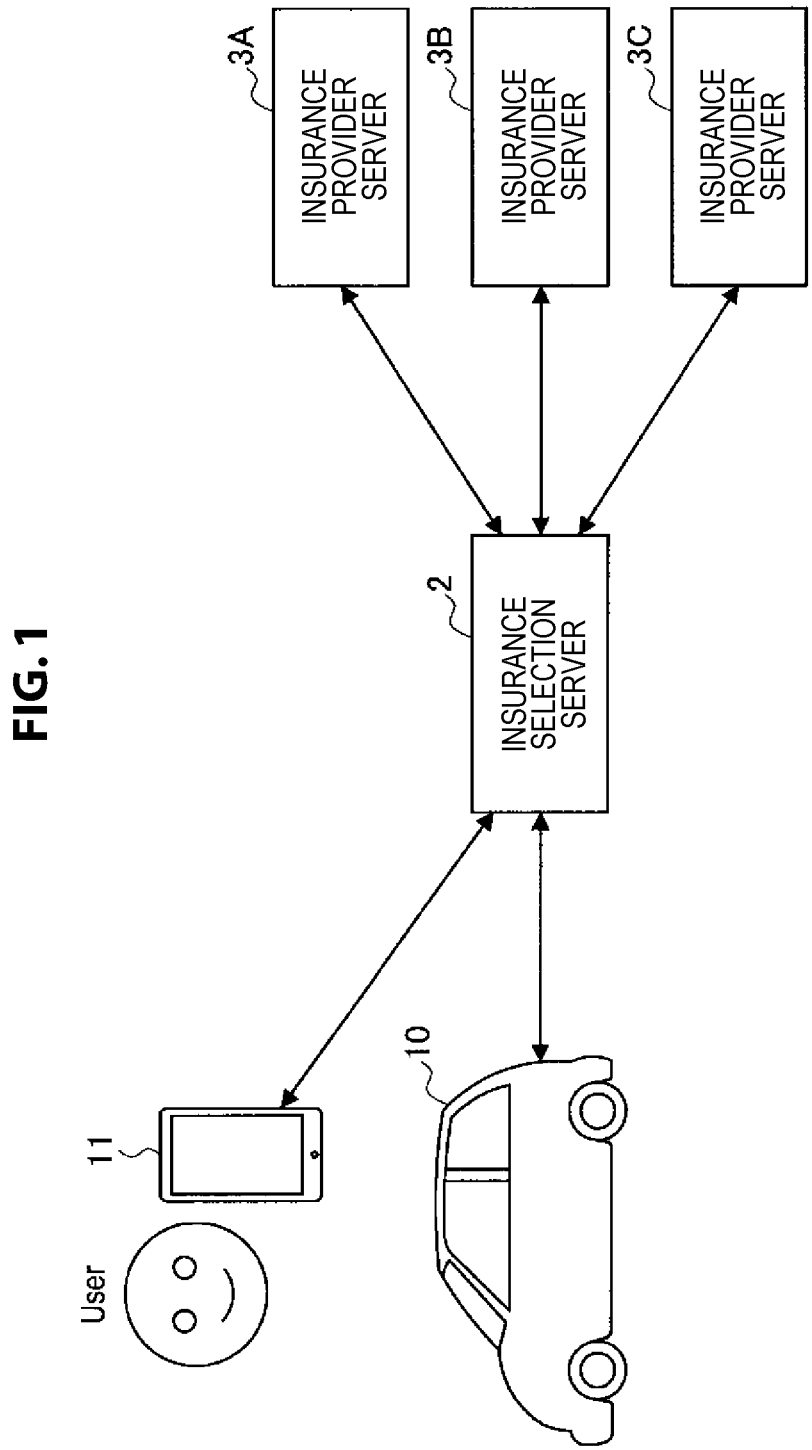
FIG. 1 is a diagram that describes an overview of an information processing system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, description will be made in the following order.
1. Overview of Information Processing System according to Embodiment of the Present Disclosure
2. Configuration
2-1. Configuration of Insurance Provider Server
2-2. Configuration of Insurance Selection Server
3. Operation Processing
4. Display Example
5. Hardware Configuration Examples
5-1. Configuration Example of Vehicle Control System
5-2. Configuration Example of Information Processing Apparatus
5-3. Others
6. Conclusion

1. Overview of Information Processing System According to Embodiment of the Present Disclosure An information processing system according to an embodiment of the present disclosure makes it possible to provide a more appropriate vehicle insurance by selecting, in accordance with the current situation, a plurality of vehicle insurances calculated on the basis of vehicle information and the like. The following describes the background to the information processing system according to the present disclosure.

Background

The essence of automobile insurances resides in the prediction of the occurrence probability of accidents and the prediction of the amount of damage in accidents. Accordingly, attempts have been made to further refine the prediction with a variety of attributes, for example, the age of a driver, a car type, and annual mileage with close ties thereto, and calculate a fair insurance fee. If necessary and sufficient information can be collected in real time from an automobile side, it is possible to make a more accurate prediction or the like about the occurrence probability of an accident and a more accurate prediction or the like about the amount of damage. The occurrence of accidents, however, entails uncertainty. Even the same information sometimes causes prediction results to vary to some extent depending on a prediction method or a prediction maker. In such a case, it is wholesome to make a market mechanism take charge of the validity of a prediction result.

Then, the present embodiment proposes an information processing system that provides a more appropriate vehicle insurance by selecting, in accordance with the current situation, a plurality of vehicle insurances which are calculated on the basis of real-time vehicle information or the like. Specifically, in the information processing system according to the present embodiment, there is provided a market that uses real-time vehicle information or the like to sell or buy a part or the entirety of insurance contracts in real time.

In addition, the information processing system according to the present embodiment uses not only real-time vehicle information or the like, but further past history information, thereby making it possible to more accurately calculate an insurance.

Here, with reference to FIG. 1, the overview of the information processing system according to the present embodiment will be described. FIG. 1 is a diagram that describes the overview of an information processing system according to an embodiment of the present disclosure.

As illustrated in FIG. 1, the information processing system according to the present embodiment includes an insurance selection server 2, an insurance provider servers 3 (3A to 3C), a vehicle 10, and a user terminal 11. The insurance selection server 2 is connected to each of the vehicle 10, the user terminal 11, and the insurance provider servers 3 via a network (not illustrated), and transmits and receive data.

The user terminal 11 is a communication terminal such as a smartphone, a mobile phone terminal, a tablet terminal, a wearable apparatus or a personal computer (PC), and transmits user information input by a user and vehicle information to the insurance selection server 2. Examples of the user information include information for identifying the user (contractor of an insurance), a contact address of the user, information regarding payment, and other information necessary for an insurance contract. In addition, examples of the information regarding a vehicle include information for uniquely identifying the vehicle, the car type, the model, the details of the installed hardware, the configuration, information for identifying the type and version or the like of the installed software, an access key for accessing the vehicle to extract necessary information, and the like. In addition, the user terminal 11 also transmits a condition regarding an insurance such as the insurance coverage expected by a user or the maximum payable insurance fee to the insurance selection server 2.

The vehicle 10 is provided with a variety of sensors that can acquire various kinds of information regarding the vehicle or a passenger. The sensor information acquired by the variety of sensors is transmitted to the insurance selection server 2 in real time. Examples of the sensor information acquired by the vehicle 10 include vital information of the user who is the driver, the number of occupants, the velocity of the vehicle, the operation values of the accelerator, the brake and the like, vehicle outside environment information, a traveling plan (departure place, departure time, current location, destination, and traveling route) of the vehicle, a use situation of an automated driving mode, and the like. In addition, the vehicle 10 may transmit not only the sensor information, but also the car type of the vehicle 10, the model, the details of the installed hardware, the configuration, the type of the installed software, the version, information indicating whether the vehicle 10 is an automated driving vehicle, and the like. In addition, information of a communication carrier used by the vehicle for communication also influences the insurance fee in some cases (e.g., in the case where a communication carrier having an arranged communication environment is used, the insurance fee is low, and in the case where a low-cost communication carrier that offers poor signal quality is used, the insurance fee is high, etc.), so that the information (or information of a communication environment) of a communication carrier used by the vehicle for communication can also be transmitted to the insurance selection server 2. In addition, information of an application and an agent used by the vehicle 10 while driving can also be transmitted to the insurance selection server 2. This is because it is anticipated, for example, that, in the case where an excellent navigation application is used, the insurance fee is low, and in the case where a music or video application is used while driving, the insurance fee is high.

The insurance selection server 2 provides the insurance provider servers 3A to 3C with the real-time information or the like acquired from the vehicle 10.

The insurance provider servers 3A to 3C have functions of calculating automobile insurances on the basis of the real-time information or the like provided from the insurance selection server 2. Note that FIG. 1 illustrates the three insurance provider servers 3A to 3C as an example, but the present embodiment is not limited thereto. Any number of insurance provider servers 3 may be provided. Specifically, the insurance provider servers 3A to 3C use the real-time information or the like provided from the insurance selection server 2 to predict the accident occurrence probability of a target vehicle, predict the amount of damage in an accident, and calculate a fair insurance fee.

Then, the insurance selection server 2 performs processing of bidding (contracting) one or more appropriate insurances from the insurances calculated by the respective insurance provider servers 3A to 3C. For example, the insurance selection server 2 may use a technique (second price auction) of selecting the one lowest insurance fee and making a contract for the price of the second lowest insurance fee. Alternatively, the insurance selection server 2 may select an insurance that satisfies an insurance condition input by a user in advance.

The information processing system according to the present embodiment performs the processing of calculating and bidding an insurance fee as described above per predetermined time (e.g., per hour) while the vehicle 10 is traveling, thereby making it possible to providing an appropriate insurance as needed in accordance with a situation change.

In addition, the insurance provider servers 3A to 3C are also capable of calculating insurance fees with reference to not only the real-time information of the vehicle 10 or the like, but also past history information of the vehicle 10 and a user. The past history information can be stored in a database of the insurance selection server 2. The insurance provider servers 3A to 3C use a unique ID for identifying the vehicle 10 or the user who is the driver, information for identifying the hardware and software installed in the vehicle 10, a traveling time slot and area, a traveling route, the current season, climate, weather, or the like as a search key to refer to history information.

In addition, the information processing system according to the present embodiment may present (feed back) not only one or more automobile insurances selected by the insurance selection server 2, but also a prediction result of accident probability and a prediction result of the amount of accident damage on which the calculation is based to a user. The user is hereby expected to take the prediction results into consideration and take actions to make a change in a traveling route and a change in a drive plan (e.g., select a safer route and time slot), a change in the way of driving (e.g., decreasing the velocity or keeping inter-vehicle distance), and the like to decrease the accident probability.

In addition, the information processing system according to the present embodiment may also present information (e.g., an accident probability prediction result of another vehicle, whether or not another vehicle has purchased an insurance, and the like) regarding another vehicle traveling near the vehicle 10 to a user of the vehicle 10. This allows the user to avoid a vehicle that has a high accident probability prediction and can be dangerously driven, and more safely drive.

In addition, analyzing a large number of prediction results of accident probability and insurance fees calculated according to the present embodiment makes a useful analysis possible such as the correlation between a dangerous traveling time slot, traveling route, and weather (and a combination thereof), and a car type. However, individualized insurance information has a privacy concern, so that it is not preferable to distribute the insurance information as data for analysis with no careful consideration. Thus, the insurance selection server 2 is also capable of deleting information such as a driver ID that directly identifies an individual from the insurance information, making use or the like of the k-anonymization technology to process a departure place, a destination, a route and the like and eliminate the privacy concern, and providing them to the third party (e.g., insurance provider) as market data.

The above describes the overview of the information processing system according to the present embodiment. In the example illustrated in FIG. 1, a "motor vehicle" is illustrated as the vehicle 10, but the present embodiment is not limited thereto. The vehicle 10 may also be a "motorcycle" and a "small vehicle."

2. Configuration

Next, the configurations of the insurance provider servers 3 and the insurance selection server 2 included in the above-described information processing system will be described with reference to FIGS. 2 to 3.

2-1. Configuration of Insurance Provider Server

Figure 2:
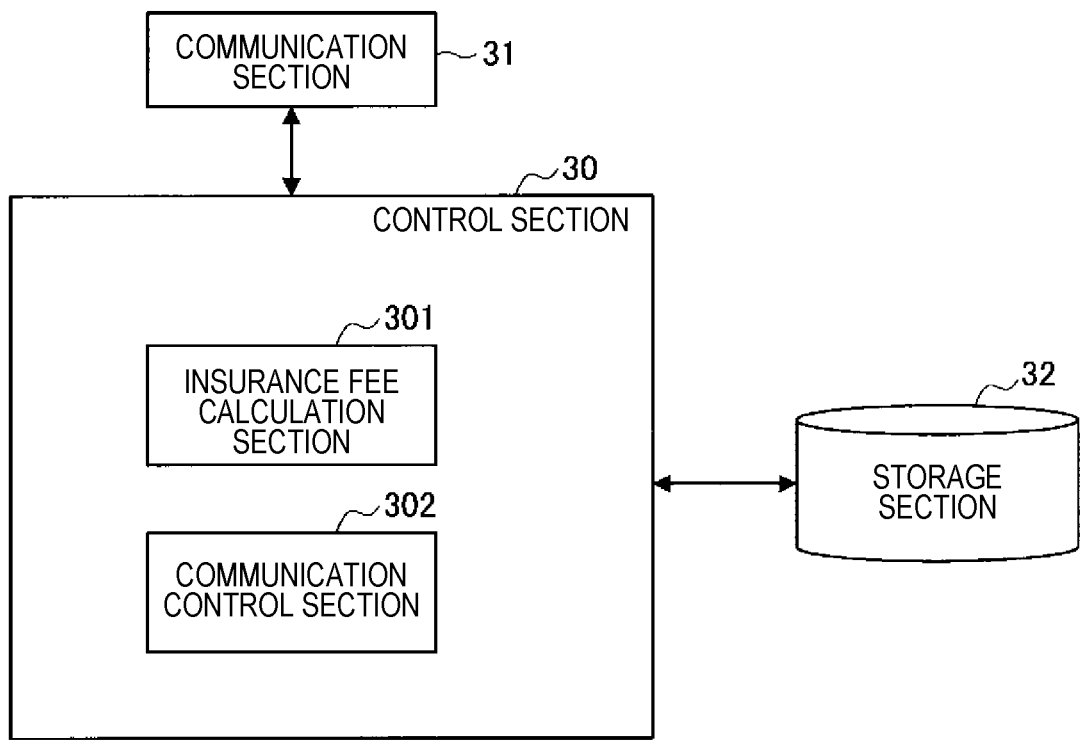
FIG. 2 is a block diagram illustrating a configuration example of an insurance provider server according to the present embodiment.

FIG. 2 is a block diagram illustrating a configuration example of the insurance provider server 3 according to the present embodiment. As illustrated in FIG. 2, the insurance provider server 3 includes a control section 30, a communication section 31, and a storage section 32.

The control section 30 functions as an operation processing apparatus and a control apparatus, and controls the overall operation of the insurance provider server 3 in accordance with a variety of programs. The control section 30 is implemented, for example, by an electronic circuit such as a central processing unit (CPU) and a microprocessor. In addition, the control section 30 according to the present embodiment functions as an insurance fee calculation section 301 and a communication control section 302.

The insurance fee calculation section 301 calculates an insurance fee on the basis of real-time sensor information, user information (attribute information), and vehicle information (attribute information) of the vehicle 10 and a user which are transmitted from the insurance selection server 2. Specifically, for example, the insurance fee calculation section 301 predicts the accident probability of the vehicle 10 and an indemnity (i.e., damage compensation or insurance payout) in real time on the basis of the real-time information or the like, and calculates an insurance fee in accordance with a prediction result. At this time, the insurance fee calculation section 301 can predict the accident probability or the indemnity before the vehicle 10 arrives at a destination or before a predetermined time (e.g., one hour) elapses, and calculate, on the basis of a result of the prediction, the automobile insurance fee before the vehicle 10 arrives at the destination or the automobile insurance fee before the predetermined time elapses. In addition, in the present embodiment, it is also possible to learn accident probability and an indemnity, and enhance prediction accuracy. Note that an algorithm for an insurance fee calculation method is not limited in particular, but the following pattern is, for example, conceivable. In addition, a different insurance fee calculation method is supposed to be used for each insurance provider.

Pattern Example 1 of Insurance Fee Calculation

The age and past accident history of an insurance contractor (chiefly a person who drives), a car type covered by an insurance, an annual mileage classification, and the like are used to calculate an annual insurance fee. The proportion of a section (time and distance) covered by the insurance this time to the annual traveling, and the like are further taken into consideration for calculation. The section covered by the insurance this time is a traveling time or mileage calculated on the basis of the set destination or selected route input by a user into the vehicle 10. Specifically, for example, it is obtained in accordance with the following expression 1.

$$\text{insurance fee} = (\text{planned mileage for this time}) / (\text{planned annual mileage}) * (\text{annual insurance fee}) \qquad \text{expression 1}$$

Pattern Example 2 of Insurance Fee Calculation

Real-time accident probability is calculated on the basis of the real-time sensor information or the like, and the proportion to baseline accident probability is used for calculation. Specifically, for example, it is obtained in accordance with the following expression 2.

$$\text{insurance fee} = (\text{real-time accident probability}) / (\text{baseline accident probability}) * (\text{baseline insurance fee}) \qquad \text{expression 2}$$

Note that a universe mean decided on the basis of the age of an insurance contractor (chiefly a person who drives), a car type covered by an insurance, an annual mileage classification and the like may be used to calculate the baseline accident probability, or the accident occurrence frequency or the like of the planned traveling area may be taken into consideration.

In addition, the real-time accident probability may be predicted, for example, on the basis of a feature regarding the vehicle 10 or the user (driver). A feature vector that is a combination of one or more features can be used to predict accident probability. A variety of methods are conceivable to predict accident probability. As an example, a prediction method that uses a logistic regression model is conceivable.

Pattern Example 3 of Insurance Fee Calculation

Similarly to the above-described pattern example 2, real-time accident probability is calculated, a transition of the accident probability in a future insurance term is further predicted from history information of accident probability calculation results up to this point, and the probability that an accident occurs in the insurance term and the degree of the damage are estimated to calculate an insurance fee. Specifically, for example, it is obtained in accordance with the following expression 3. Here, the margin represents a sales profit of an insurance provider.

$$\text{insurance fee} = (\text{accident occurrence probability in term}) * (\text{estimated indemnity}) * (\text{margin}) \qquad \text{expression 3}$$

In addition, examples of the real-time information used by the insurance fee calculation section 301 to calculate an insurance fee include the following information. Here, examples of the real-time information transmitted from the insurance selection server 2 are listed.

Information Regarding Driver

- a unique ID for identifying a driver (user) or information for generating the unique ID
- age and sex
- a driver's license number
- vital information (such as heart rates, pulses, blood pressure, body temperature, blood glucose levels, breath alcohol concentration, blood alcohol concentration, blood oxygen concentration, awakening degrees, concentration degrees, feelings, emotions, and brain waves) of a driver
- information regarding motion or an action state such as a driver's attitude, line of sight, and body movement information Information Regarding Occupant

- the number of people, age, sex, a seat position, and a use situation of a safety apparatus such as a seat belt
- vital information (such as heart rates, pulses, blood pressure, body temperature, blood glucose levels, breath alcohol concentration, blood alcohol concentration, blood oxygen concentration, awakening degrees, concentration degrees, feelings, emotions, and brain waves) of the occupant
- information regarding motion or an action state such as the occupant's attitude, line of sight, and body movement information Information Regarding Vehicle Inside Environment

- environment measurement values (such as air temperature, humidity, air volume, vibration, noise, illuminance, and oxygen concentration) inside the vehicle (at each seat position in addition to a driver's seat and a passenger seat)

Information Regarding Identification of Vehicle

- a unique ID for identifying a vehicle or information for generating the unique ID
- information (such as version information of the installed software, information of an application (including a navigation application and the like) and an agent used while driving, and configuration information including the type of an installed sensor, the number/disposition of installed sensors, and the like) for identifying the installed hardware and software of the vehicle
- an automated driving vehicle or not Real-Time Information Regarding Motion of Vehicle the position and advancing direction (and the measurement accuracy thereof) of the vehicle the velocity, angular velocity, acceleration, and angular acceleration (and the measurement accuracy thereof) of the vehicle operation values regarding an accelerator, a brake, and a steering an activation situation of a safety apparatus such as an antilock brake system (ABS), a traction control system (TCS), a lane keep assist system (LKAS), or an active cruise control (ACC), information related to malfunction, warning information, and error information.

a use situation of an automated driving mode information of a communication carrier to be used information of an application and an agent to be used Information Regarding Vehicle Outside Environment the position and advancing direction of a nearby vehicle (including a motorcycle) in the vicinity of the vehicle, velocity, angular velocity, acceleration, angular acceleration (and the measurement accuracy thereof), and a past measurement history an activation situation of a brake lamp, a blinker, a hazard lamp and the like of a nearby vehicle (including a motorcycle) in the vicinity of the vehicle, and a past measurement history V2V communication data from a nearby vehicle (including a motorcycle) in the vicinity of the vehicle the position and advancing direction of a small vehicle in the vicinity of the vehicle, velocity, angular velocity, acceleration, angular acceleration (and the measurement accuracy thereof), and a past measurement history the position and advancing direction of a pedestrian in the vicinity of the vehicle, velocity, angular velocity, acceleration, angular acceleration (and the measurement accuracy thereof), and a past measurement history a state of a traffic light in the vicinity of the vehicle, in particular, in front of the vehicle. In addition, information regarding an accident, construction, a closed lane, and the like on a road on which the automobile travels V2X communication data received from a pedestrian in the vicinity of the vehicle or infrastructure outside the vehicle information regarding the climate and weather of an area in which the vehicle travels V2V and V2X communication data transmitted by the vehicle to an automobile in the vicinity of the vehicle and a facility outside the vehicle sensor raw data sensed by a sensor installed in the vehicle, data such as a result of the recognition obtained by processing a sensor output, a past measurement history, and the like Information Regarding Traveling Plan of Vehicle a departure place and departure time, a destination (which may be a plurality of candidates), a traveling-planned area, or the like the current location and the current time a (planned) traveling route from a departure place to a destination (candidate)

insurance start time and a (predicted) traveling position at that time point, and insurance expiration time and a (predicted) traveling position at that time point The above describes an example of the real-time information that can be transmitted from the insurance selection server 2 and used by the insurance provider servers 3.

The communication control section 302 performs control to transmit the insurance fee calculated by the insurance fee calculation section 301 to the insurance selection server 2 via the communication section 31. In addition, at this time, the communication control section 302 may transmit the prediction results of accident probability and an indemnity used for the insurance fee calculation together to the insurance selection server 2.

The communication section 31 is a communication module for transmitting and receiving data to and from another apparatus in a wired/wireless manner.

The storage section 32 is implemented by a read only memory (ROM) that stores a program, an operation parameter and the like to be used for the processing of the control section 30, and a random access memory (RAM) that temporarily stores a parameter and the like varying as appropriate.

2-2. Configuration of Insurance Selection Server

Figure 3:
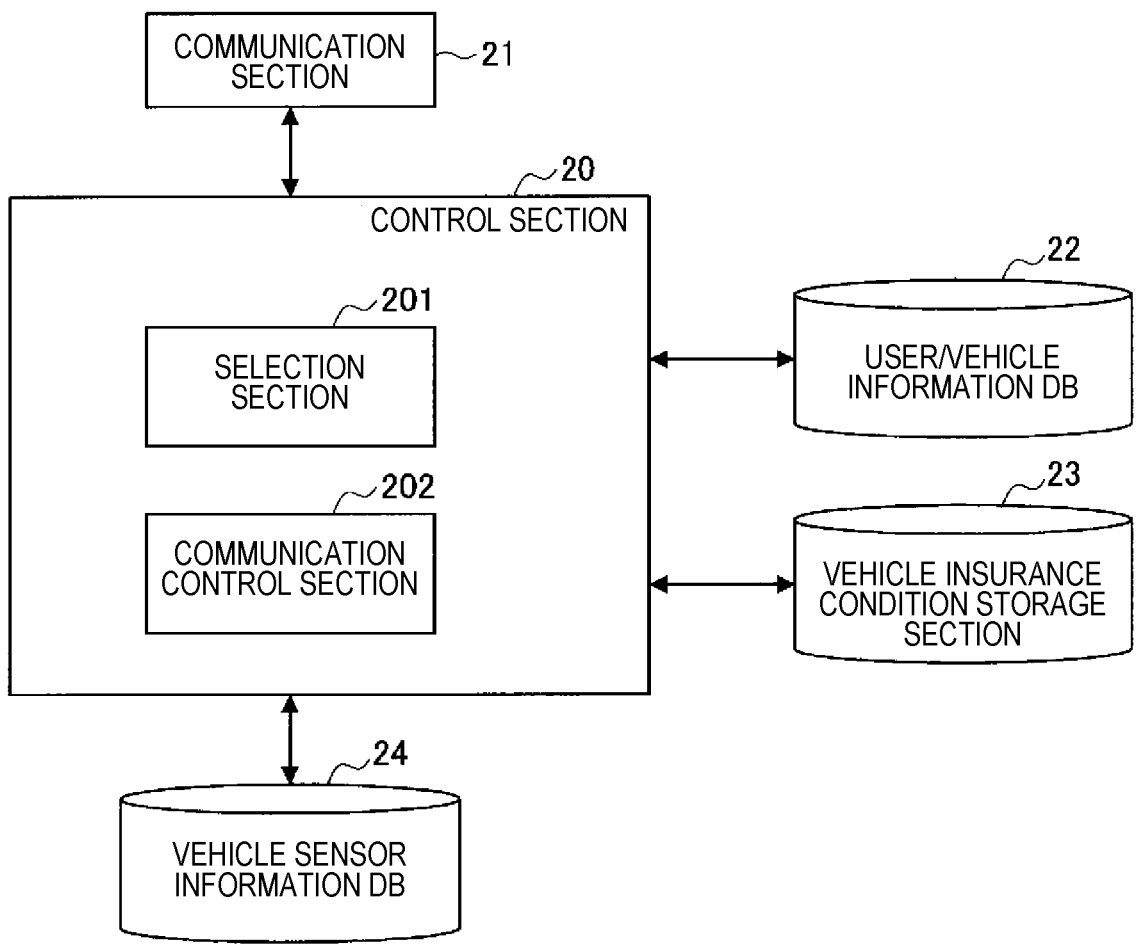
FIG. 3 is a block diagram illustrating a configuration example of an insurance selection server according to the present embodiment.

FIG. 3 is a block diagram illustrating a configuration example of the insurance selection server 2 according to the present embodiment. As illustrated in FIG. 3, the insurance selection server 2 includes a control section 20, a communication section 21, a user/vehicle information DB 22, a vehicle insurance condition storage section 23, and a vehicle sensor information DB 24.

The control section 20 functions as an operation processing apparatus and a control apparatus, and controls the overall operation of the insurance selection server 2 in accordance with a variety of programs. The control section 30 is implemented by an electronic circuit, for example, a CPU, a microprocessor, or the like. In addition, the control section 20 according to the present embodiment functions as a selection section 201 and a communication control section 202.

The selection section 201 selects one or more appropriate automobile insurances from the respective automobile insurances calculated and transmitted by the insurance provider servers 3A to 3C. Specifically, the selection section 201 can make a selection on the basis of a vehicle insurance condition preset by a user, attribute information of the vehicle 10, the user (driver) and a passenger, the real-time sensor information and movement route information acquired from the vehicle 10, and the like. The vehicle insurance condition is accumulated in the vehicle insurance condition storage section 23. The attribute information or the like of the vehicle 10, the user (driver), and a passenger is accumulated in the user/vehicle information DB 22. The real-time sensor information, movement route information, and the like acquired from the vehicle 10 is accumulated in the vehicle sensor information DB 24.

For example, the selection section 201 may select an insurance whose insurance fee is the lowest, set an insurance whose insurance fee is the second lowest (second price) as the insurance at that time, and make a selection from the insurances that satisfy a vehicle insurance condition set by a user. In this way, a real-time insurance market can be achieved by the selection section 201 selecting one or more appropriate automobile insurances from a plurality of automobile insurances.

The communication control section 202 performs control to transmit information necessary to calculate an automobile insurance in response to requests from the insurance provider servers 3.

The communication section 21 is a communication module for transmitting and receiving data to and from another apparatus in a wired/wireless manner. For example, the communication section 21 receives information regarding a user from the user terminal 11, and receives real-time sensor information, occupant information, driver (user) information, and the like of the vehicle 10 from the vehicle 10.

The user/vehicle information DB 22, the vehicle insurance condition storage section 23, and the vehicle sensor information DB 24 are included in a storage section (not illustrated) provided to the insurance selection server 2. The storage section is implemented by a ROM that stores a program, an operation parameter, and the like used for the processing of the control section 20, and a RAM that temporarily stores a parameter and the like varying as appropriate.

The user/vehicle information DB 22 accumulates information regarding a user and the vehicle 10. Examples of the information regarding a user include a user ID, a name, sex, age, a driving history, and the like. In addition, as the information regarding the vehicle 10, a car type, total mileage, fuel consumption information, and the like are conceivable.

The vehicle insurance condition storage section 23 accumulates information regarding a vehicle insurance condition (limit of an insurance fee, disclaimer, compensation coverage, and the like) input by a user from the user terminal 11 and the like.

The vehicle sensor information DB 24 accumulates information sensed by a variety of sensors installed in the vehicle 10, route information input by a user, destination information, and the like.

The above specifically describes the configurations of the insurance provider servers 3 and the insurance selection server 2 according to an embodiment of the present disclosure.

Note that the control section 20 according to the present embodiment may keep real-time information and the like accompanying an automobile insurance contract that is a past purchase target in a log for a predetermined period of time, and extract and transmit information from the log in response to requests from the insurance provider servers 3.

In addition, in the case where the real-time information becomes deficient for some reason such as a temporary communication problem, the control section 20 may use the past history information and the like to complement the deficient part and transmit information in response to requests from the insurance provider servers 3.

In addition, the control section 20 may transmit a tendering situation and bidding information (information of a selected and contracted automobile insurance) of the automobile insurance that is a purchase target to not only a seller and a buyer (e.g., insurance provider), but also the vehicle 10, the user terminal 11, and a passenger (user or occupant) of the vehicle 10. The tendering situation is tendering information (such as an insurance fee and compensation coverage) of each of the insurance provider servers 3 participating in buying and selling of the automobile insurance. Examples of the information to be transmitted include the following.

an underwriting insurance fee
underwriting insurance coverage (such as a compensation type and a compensation limit)
a predicted value of accident probability or rating information of a danger degree In addition, the control section 20 may aggregate information regarding insurance contracts of vehicles traveling in the neighborhood of the vehicle 10, and transmit danger degree rating information of automobiles in the vicinity to the vehicle 10.

In addition, the control section 20 may present an automobile insurance selected by the selection section 201 to a user, and make a contract in the case where approval is obtained from the user, or present a plurality of selected automobile insurances to a user for selection. In addition, the control section 20 may contract an automobile insurance selected by the selection section 201 (without the user's confirmation).

In addition, the control section 20 aggregates and anonymizes information regarding the concluded insurance contract, thereby making analysis possible in association with the position or traveling route of the automobile, a traveling time slot, the insurance term, the car type, or the like. The information regarding an insurance contract also includes a prediction result of accident probability. Accordingly, for example, analyzing accident probability in association with a position and a traveling route makes it possible to grasp a place in which accidents are likely to occur.

Next, the operation processing of the information processing system according to the present embodiment will be described with reference to FIG. 4.

3. Operation Processing

Figure 4:
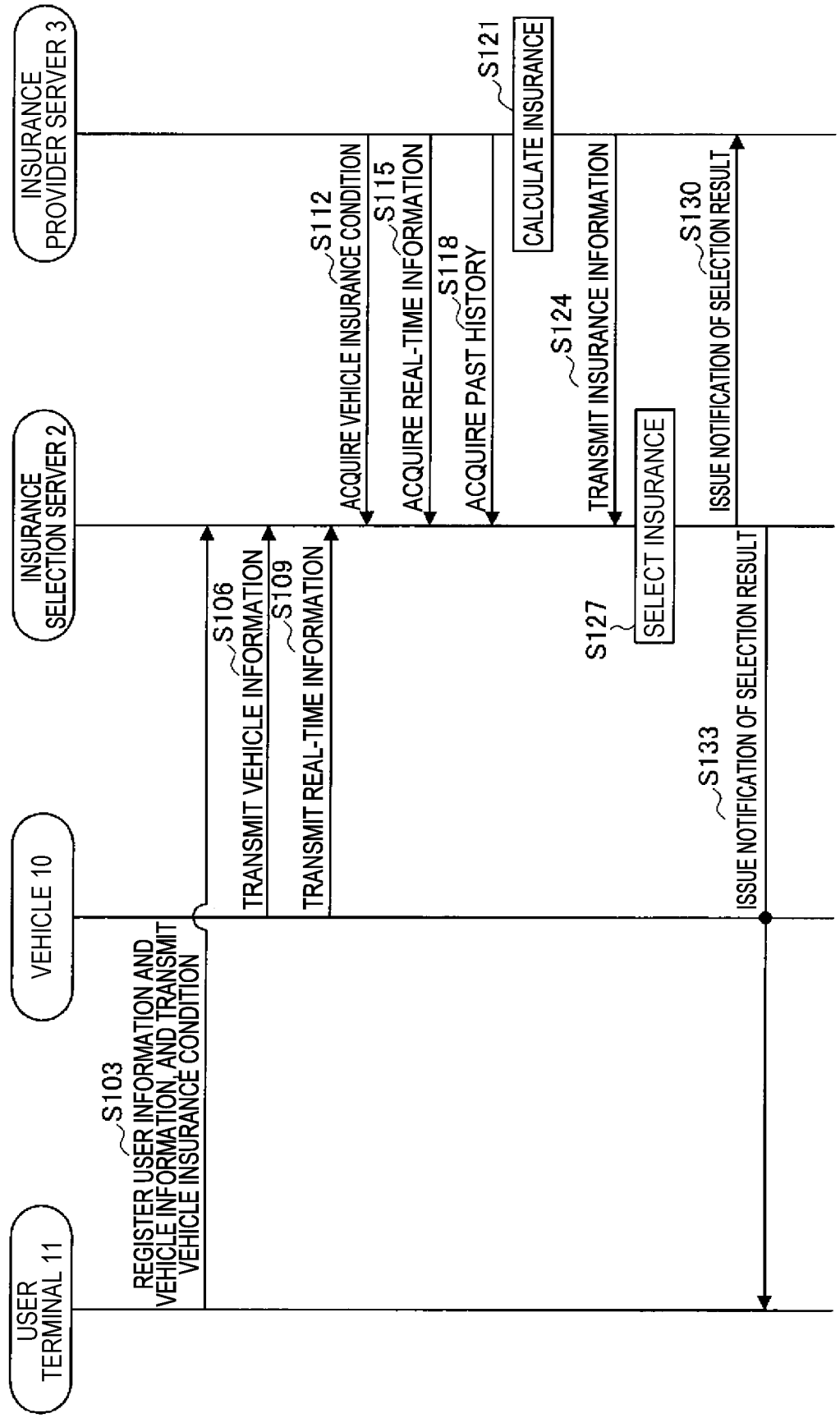
FIG. 4 is a flowchart illustrating operation processing according to the present embodiment.

FIG. 4 is a flowchart illustrating the operation processing according to the present embodiment. As illustrated in FIG. 4, first, the user terminal 11 transmits user information, vehicle information, and a vehicle insurance condition to the insurance selection server 2 in response to a user operation (step S103). The user information and the vehicle information include information (e.g., user ID) for identifying a contractor, a contact address, information regarding payment, and other information necessary for an insurance contract. In addition, the vehicle information may include information (e.g., vehicle ID) of the insurance contract target vehicle 10 which, for example, uniquely identifies the vehicle 10, the car type, the model, the details and configuration of the installed hardware, the type of the installed software, information regarding the version and the like, an access key to information possessed by the vehicle 10. In addition, the vehicle insurance condition may include conditions regarding insurance coverage (minimum compensation coverage) expected by a user, and a maximum payable insurance fee (payable limit).

Then, the insurance selection server 2 accesses the vehicle 10 covered by the insurance to additionally acquire necessary information. The vehicle 10 transmits vehicle information to the insurance selection server 2 in response to a request from the insurance selection server 2 (step S106). Examples of the information additionally acquired include the car type of the vehicle 10, the model, the details and configuration of the installed hardware, information for identifying the type, version, and the like of the installed software, information (such as a departure place, departure time, a destination, and a traveling route) regarding a traveling plan of the vehicle 10, and the like.

Next, the vehicle 10 transmits real-time information to the insurance selection server 2 (step S109). The real-time information includes, as described above, information regarding a driver, information regarding an occupant, information regarding a vehicle inside environment, real-time information regarding motion of a vehicle, information regarding a vehicle outside environment, or information regarding a traveling plan of a vehicle. This real-time information is stored in the vehicle sensor information DB 24 of the insurance selection server 2. Note that the real-time information to be stored can be stored along with data acquisition time. The "data acquisition time" is desirably as dense and equidistant as possible within the range having no useless or redundant information amount. In addition, in the case where no data is found that corresponds to appropriate "data acquisition time," the control section 20 of the insurance selection server 2 may complement data for creation, and save/store the data. For complementation, k pieces of data that are the temporally closest are used. For example, in the case where one piece of data is used for complementation, the control section 20 duplicates the nearest for complementation. In addition, in the case where two pieces of data are used for complementation, the control section 20 makes linear complementation. In addition, in the case where three pieces of data are used for complementation, the control section 20 makes complementation, for example, with a quadratic function. In the case where a complementation target is a real number value, any complementation algorithm can be used in this way. Note that, in the case where a complementation target is a discrete value and it is not possible to define significant calculation, the k-nearest neighbor algorithm based on a vote of the k nearest pieces of data is used.

Then, the insurance provider servers 3 access the insurance selection server 2 (real-time insurance market) to acquire, as information regarding a bid insurance contract case, a vehicle insurance condition (including vehicle information, driver information, expected compensation coverage, an insurance term, and the like) (step S112). At this time, an access key to the log DB (vehicle sensor information DB 24) of real-time information regarding the car (vehicle 10) covered by the insurance is provided to the insurance provider servers 3.

Then, the insurance provider servers 3 acquire information necessary to calculate an automobile insurance from the insurance selection server 2 with the above-described access key. Specifically, for example, the insurance provider servers 3 acquire the newest real-time information regarding the vehicle 10 and a past history thereof (steps S115 and S118).

Next, the insurance provider servers 3 calculate automobile insurances on the basis of the acquired information (step S121). Specifically, the insurance provider servers 3 use the insurance fee calculation section 301 to predict accident probability and an indemnity of the car (vehicle 10) covered by the insurance in the insurance term, and calculate fair insurance fees on the basis of prediction results for tendering. Note that, in the case where an insurance fee (tendering price) is fixed, the insurance fee calculation section 301 may calculate the insurance coverage (i.e., compensation coverage) corresponding to the amount of money.

Then, the insurance provider servers 3 transmit information (insurance information: including information such as insurance fees, compensation coverage, and insurance terms) regarding the calculated insurances to the insurance selection server 2 (step S124). At this time, the insurance provider servers 3 may transmit together the prediction results of accident probability on which the calculation is based.

Next, the insurance selection server 2 selects the insurance transmitted from each of the insurance provider servers 3 (step S127). Specifically, for example, the insurance selection server 2 selects and contracts one or more appropriate insurances from the respective insurances (each of the tendered insurances) calculated by the insurance provider servers 3 by the insurance start time. For example, the insurance selection server 2 may use the technique (second price auction) of selecting one insurance whose insurance fee is the lowest, and making a contract for the price of the second lowest insurance fee to conclude the contract.

Then, the insurance selection server 2 transmits a selection result to the insurance provider servers 3, the vehicle 10, and the user terminal 11 (steps S130 and S133)

The above-described insurance selection processing is repeated for a predetermined period of time. An insurance fee is calculated for each time on the basis of real-time information acquired by the insurance provider servers 3 from the vehicle 10. For example, an insurance fee for ten minutes for which the vehicle 10 moves to a spot G is selected by the insurance selection server 2, and then an insurance fee for the next ten minutes is selected. Such selection processing is repeated until the vehicle 10 arrives at the spot G In addition, in the case where an insurance fee is calculated on the basis of a traveling plan (including route information), a change in the traveling plan also changes the insurance fee. Accordingly, when the traveling plan of the vehicle 10 is changed, the next insurance can be selected in an interruptive manner.

4. Display Example

Next, each UI according to the present embodiment will be described with reference to FIGS. 5 to 10.

Figure 5:
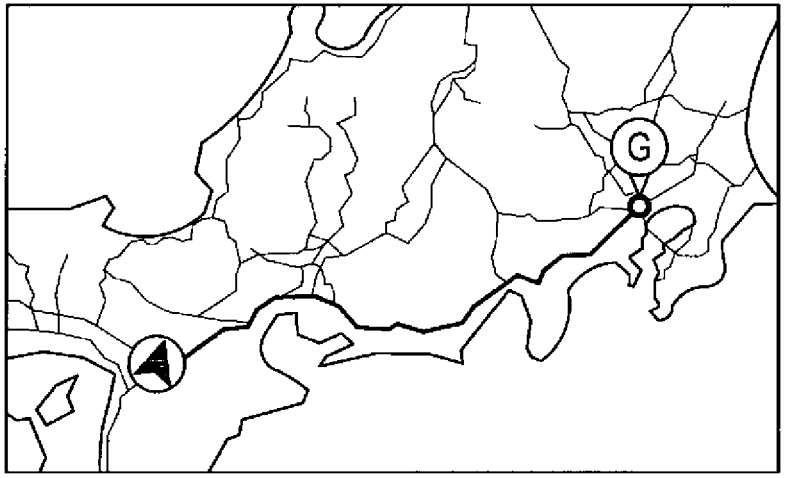
FIG. 5 is a diagram illustrating an example of an insurance condition input screen according to the present embodiment.

FIG. 5 is a diagram illustrating an example of an insurance condition input screen according to the present embodiment. In the illustrated example, data such as a contractor (name and user ID), a car type (car type number and vehicle ID), a traveling plan (date and time, destination, and waypoint designation), insurance information (insurance coverage, insurance term, and insurance update) is input into a screen 40. A map image displayed on the screen 40 displays a route based on a traveling plan. This screen 40 is displayed on a display installed in the user terminal 11 or the vehicle 10. Once a submit button on the screen 40 is selected, the input data is transmitted to the insurance selection server 2 via a network.

FIG. 6 is a diagram illustrating an example of an insurance presentation screen according to the present embodiment. In the illustrated example, as insurance coverage selected and contracted by the insurance selection server 2, a contractor, a car type, a traveling plan (date and time, destination, and waypoint designation), insurance coverage, an insurance term, an insurance provider, an insurance fee, and a rating are displayed on a screen 41. Here, the rating is an example of a danger degree based on an accident probability predicted value or damage (such as the type of insurance and a car type) in an accident, and expresses it with ratings and colors to improve the visual recognizability. In addition, here, a rating A represents the lowest danger degree (low accident probability, heavy indemnity, or the like). A rating B, a rating C . . . have higher danger degrees (high accident probability, light indemnity, or the like) in this order. In addition, the insurance term of an automobile insurance according to the present embodiment is a predetermined time such as "2015/8/31 8:00 to 14:00" in accordance with a traveling plan, which is different from an automobile insurance agreed with a contract valid in units of years such as one year.

Figure 7:
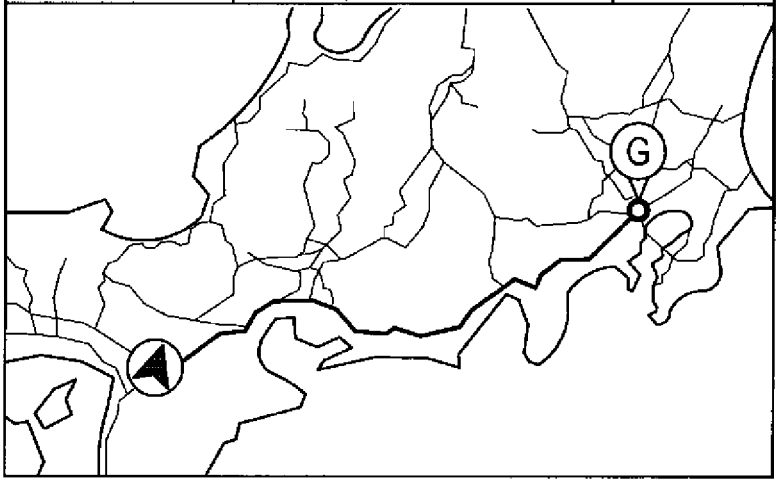
FIG. 7 is a diagram illustrating an example of an insurance selection screen according to the present embodiment.

Note that the insurance selection server 2 according to the present embodiment may present one or more automobile insurances selected by the selection section 201 to a user, and contract an insurance approved by the user. FIG. 7 illustrates a screen display example in which a candidate for an automobile insurance is presented to a user for selection. In the illustrated example, as candidates for insurances selected by the insurance selection server 2, for example, three insurances are presented on a screen 42. Examples of the presented information include an insurance provider name, insurance coverage, and an insurance fee. A user selects an insurance that the user wishes to contract from these insurances, and a selection result is transmitted to the insurance selection server 2. In addition, when presenting a plurality of candidates for automobile insurances to a user, the insurance selection server 2 is also capable of displaying, as a recommended plan, an insurance closer to an insurance condition input by the user in advance.

The above-described insurance presentation screens (screen 41 and screen 42) are displayed on a display installed in the user terminal 11 or the vehicle 10.

Figure 8:
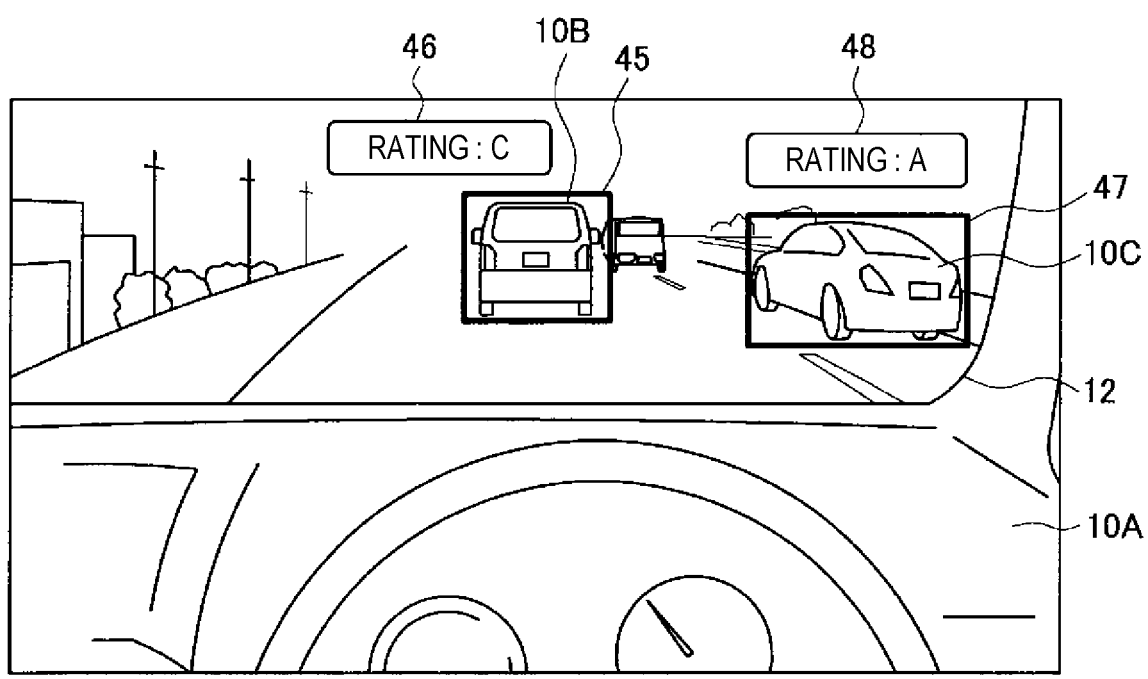
FIG. 8 is a diagram illustrating a presentation example of vehicle information of a vehicle according to the present embodiment which is traveling in a neighborhood.

FIG. 8 is a diagram illustrating a presentation example of vehicle information of a vehicle according to the present embodiment which is traveling in a neighborhood. The insurance selection server 2 according to the present embodiment is capable of acquiring the accident probability and the insurance purchase information of other vehicles 10B and 10C traveling in the vicinity of a vehicle 10A of a user, and presenting the danger degree ratings of the vehicles in the vicinity to the user. Specifically, as illustrated in FIG. 8, frame images 45 and 47 displayed to surround the vehicle 10B and the vehicle 10C such that the respective vehicles are identified, and images 46 and 48 showing the ratings (which can be calculated, for example, on the basis of the predicted values of the real-time accident probability, whether or not insurances have been purchased, and the insurance coverage) of the danger degrees input into the respective vehicles are AR-displayed on a windshield 12 of the vehicle 10A. This allows the driver and an occupant of the vehicle 10A to easily know the danger degrees of the vehicles traveling in the vicinity. The rating information of the other vehicles may be directly received by the vehicle 10A from the other vehicles 10B and 10C (use of vehicle-to-vehicle communication).

Note that a display method for the rating information of a danger degree according to the present embodiment is not limited AR display on a windshield as illustrated in FIG. 8. For example, a bird view screen or a top view screen generated, for example, with computer graphics (CG) may be displayed on a display apparatus (which may be obtained by fixing the user terminal 11 such as a smartphone) installed in the vicinity of the steering. Displaying a bird view or a top view makes it possible to easily grasp the positional relationship between the user vehicle and a vehicle in the surroundings. Here, FIG. 9 is a diagram that describes the case where danger degree rating information of another vehicle traveling in the neighborhood is displayed as a top view screen.

Figure 9:
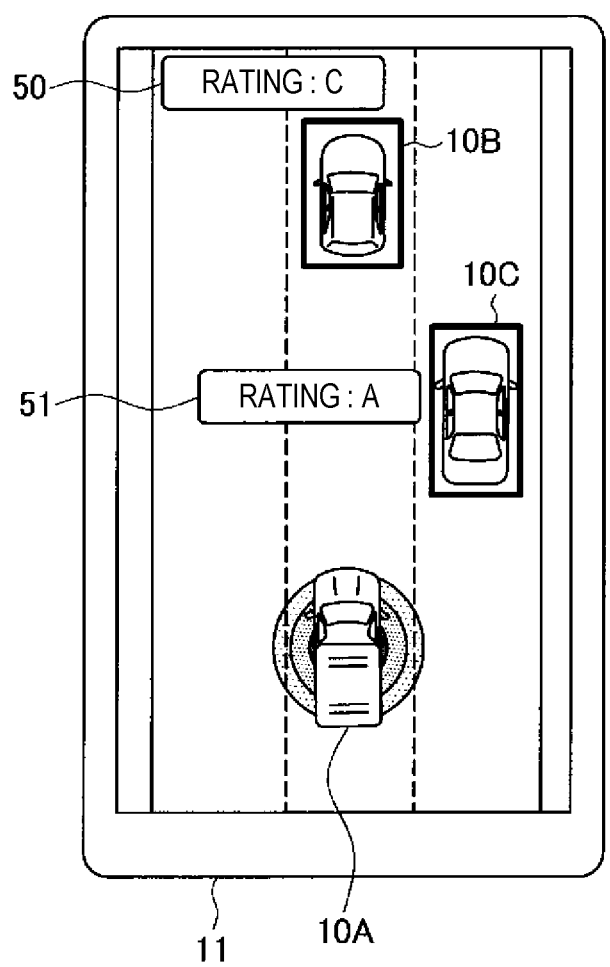
FIG. 9 is a diagram illustrating another presentation example of the vehicle information according to the present embodiment regarding a vehicle traveling in the neighborhood.

The user vehicle (vehicle 10A) and the vehicles 10B and 10C in the vicinity are displayed on the map on the display of the user terminal 11 illustrated in FIG. 9. Note that the user terminal 11 is installed in the neighborhood of the steering such that the driver is able to visually recognize the user terminal 11 without distracting the line of sight much from the front while driving. An image displayed on the user terminal 11 can be generated, for example, by the control section 20 of the insurance selection server 2. In addition, the positional relationship between the respective vehicles can be grasped on the basis of signals received from the respective vehicles or an image captured by cameras that is provided to the vehicle 10A and images the environment in the vicinity.

Then, images 50 and 51 showing the rating information of danger degrees are displayed to correspond to the vehicles 10B and 10C. This allows a user of the vehicle 10A to easily grasp the danger degree rating information of the vehicles in the neighborhood.

Figure 10:
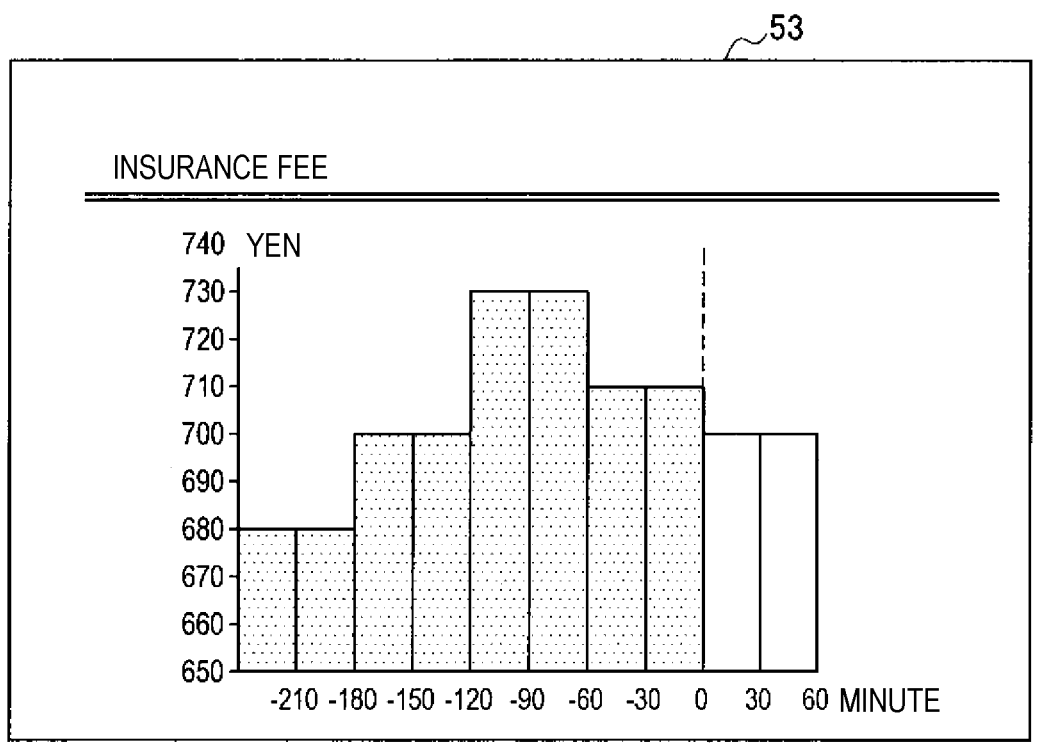
FIG. 10 is a diagram illustrating a screen example in which an insurance fee transition per time according to the present embodiment is displayed.

FIG. 10 is a diagram illustrating a screen example in which an insurance fee transition per time is displayed. In the illustrated example, an insurance fee transition per time is displayed on a screen 53. Here, as an example, automobile insurances are contracted every 60 minutes. The insurance fees and insurance coverage are different depending on time. The screen 53 is displayed on a display installed in the user terminal 11 and the vehicle 10. This allows a user who drives the vehicle 10 to confirm an insurance fee transition per time.

5. Hardware Configuration Example

The above-described information processing system according to the present embodiment uses the insurance selection server 2 to select an insurance, and presents information regarding the contracted insurance via a display installed in the user terminal 11 or the vehicle 10. Here, at least a part of the functions of the insurance selection server 2 may be executed by a vehicle control system 900 (not illustrated) installed in the vehicle 10. The vehicle control system 900 may be implemented as a system mounted on any type of vehicle such as an automobile, an electric vehicle, a hybrid electric vehicle, or a motorcycle. In addition, at least some of the components of the vehicle control system 900 may be implemented in a module (e.g., integrated circuit module including one die) for an apparatus mounted on a vehicle.

Figure 11:
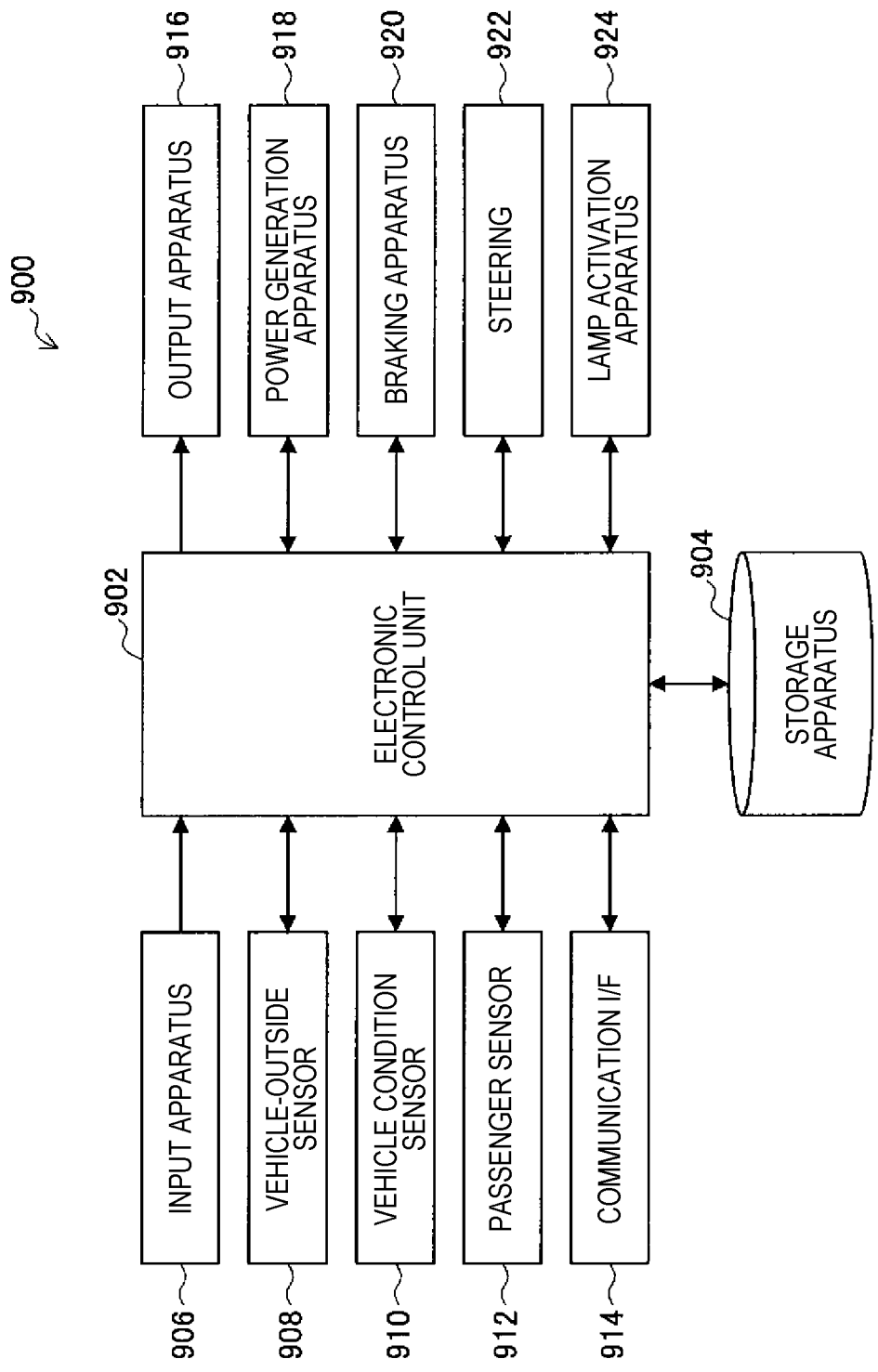
FIG. 11 is a block diagram illustrating an example of a schematic configuration of a vehicle control system to which technology according to the present disclosure can be applied.

FIG. 11 is a block diagram illustrating an example of the schematic configuration of the vehicle control system 900 to which the technology according to the present disclosure can be applied. The vehicle control system 900 includes an electronic control unit 902, a storage apparatus 904, an input apparatus 906, a vehicle-outside sensor 908, a vehicle condition sensor 910, a passenger sensor 912, a communication IF 914, an output apparatus 916, a power generation apparatus 918, a braking apparatus 920, a steering 922, and a lamp activation apparatus 924.

The electronic control unit 902 functions as an operation processing apparatus and a control apparatus, and controls the overall operation of the vehicle control system 900 in accordance with a variety of programs. The electronic control unit 902 can be configured as an electronic control unit (ECU) along with the storage apparatus 904 described below. A plurality of ECUs (i.e., electronic control unit 902 and storage apparatus 904) may be included in the vehicle control system 900. For example, ECUs for controlling each of various sensors or various drive systems may be provided thereto, and an ECU for controlling the plurality of those ECUs in cooperative manner may be further provided. The plurality of these ECUs are connected via an in-vehicle communication network such as a controller area network (CAN), a local interconnect network (LIN), a local area network (LAN), or Flexray that is compliant with any standard.

The storage apparatus 904 is an apparatus for data storage which is configured as an example of a storage section of the vehicle control system 900. The storage apparatus 904 is implemented, for example, by a magnetic storage section device such as a HDD, a semiconductor storage device, an optical storage device, a magneto-optical storage device, or the like. The storage apparatus 904 may include a storage medium, a recording apparatus that records data in the storage medium, a readout apparatus that reads out data from the storage medium, a deletion apparatus that deletes data recoded in the storage medium, and the like. This storage apparatus 904 stores a program to be executed by the electronic control unit 902, various kinds of data, various kinds of data acquired from the outside, and the like.

The input apparatus 906 is implemented, for example, by an apparatus such as a mouse, a keyboard, a touch panel, a button, a microphone, a switch, and a lever into which a passenger (driver or occupant) inputs information. In addition, the input apparatus 906 may be, for example, a remote control apparatus using infrared light or other radio waves, or may be an external connection device such as a mobile phone or a PDA supporting the operation of the vehicle control system 900. In addition, the input apparatus 906 may be, for example, a camera. In that case, a passenger can input information according to a gesture. Further, the input apparatus 906 may include an input control circuit or the like that generates an input signal, for example, on the basis of information input by a user using the above-described input means, and outputs the generated input signal to the electronic control unit 902. The passenger is able to input various kinds of data to the vehicle control system 900 or instruct the vehicle control system 900 about a processing operation by operating this input apparatus 906.

The vehicle-outside sensor 908 is implemented by a sensor that detects information of the outside of the vehicle. For example, the vehicle-outside sensor 908 may include a sonar apparatus, a radar apparatus, a light detection and ranging or laser imaging detection and ranging (LIDAR) apparatus, a camera, a stereo-camera, a time of flight (ToF) camera, an infrared sensor, an environment sensor, a microphone, or the like.

The vehicle condition sensor 910 is implemented by a sensor that detects information regarding a vehicle condition. For example, the vehicle condition sensor 910 may include a sensor that detects an operation performed by a driver such as an accelerator opening degree, brake stepping force, or a steering wheel angle. In addition, the vehicle condition sensor 910 may include a sensor that detects a condition of a power source such as the rotation speed or torque of an internal combustion engine or a motor. In addition, the vehicle condition sensor 910 may include a sensor such as a gyro sensor or an acceleration sensor for detecting information regarding the movement of the vehicle. In addition, the vehicle condition sensor 910 may include a global navigation satellite system (GNSS) module that receives GNSS signals (e.g., global positioning system (GPS) signals from a GPS satellite) from a GNSS satellite, and measures position information including the latitude, longitude, and altitude of the apparatus. Note that, with respect to the position information, the vehicle condition sensor 910 may sense the position through Wi-Fi (registered trademark), transmission and reception to and from a mobile phone/PHS/smartphone or the like, near field communication, or the like.

The passenger sensor 912 is implemented by a sensor that detects information regarding a passenger. For example, the passenger sensor 912 may include a camera, a microphone, and an environment sensor provided to a vehicle compartment. In addition, the passenger sensor 912 may include a biometric sensor that detects biometric information of a passenger. The biometric sensor is attached, for example, to a seating face, the steering wheel, or the like, and is capable of detecting biometric information of the passenger sitting on the seat or the driver gripping the steering.

Note that various sensors such as the vehicle-outside sensor 908, the vehicle condition sensor 910, and the passenger sensor 912 each output information showing a detection result to the electronic control unit 902. These various sensors may set the sensing area, accuracy, or the like on the basis of the control of the electronic control unit 902. In addition, these various sensors may include a recognition module that performs recognition processing based on raw data such as processing of recognizing the driving position of an own vehicle on a road, for example, on the basis of the position of a lane line included in a taken captured image.

The communication IF 914 is a communication interface that mediates communication performed by the vehicle control system 900 with another apparatus. The communication IF 914 can include, for example, a V2X communication module. Note that V2X communication is a concept including vehicle-to-vehicle communication and vehicle-to-infrastructure communication. Additionally, the communication IF 914 may also include a communication module for a wireless local area network (LAN), Wi-Fi (registered trademark), 3G; long term evolution (LTE), Bluetooth (registered trademark), near field communication (NFC) or wireless USB (WUSB). This communication IF 914 is capable of transmitting and receiving signals or the like, for example, to and from the Internet or other communication devices outside the vehicle in compliance with a predetermined protocol, for example, TCP/IP or the like.

The output apparatus 916 is implemented by an apparatus capable of visually or aurally notifying a passenger of acquired information. Such an apparatus includes a display apparatus such as an instrument panel, a head-up display, a projector or a lamp, and a sound output apparatus such as a speaker or headphones. Specifically, the display apparatus visually displays results obtained from various kinds of processing performed by the vehicle control system 900 in a variety of forms such as text, an image, a table, and a graph. At that time, a virtual object such as an augmented reality (AR) object may be displayed. Meanwhile, the sound output apparatus converts audio signals including reproduced sound data, acoustic data, or the like into analog signals, and aurally outputs the analog signals.

The power generation apparatus 918 is an apparatus for generating driving force for the vehicle. The power generation apparatus 918 may be implemented, for example, by an internal combustion engine. In that case, the power generation apparatus 918 performs start control, stop control, throttle valve opening degree control, fuel injection control, exhaust gas recirculation (EGR) control, or the like on the basis of a control command from an electronic control unit 902. In addition, the power generation apparatus 918 may be implemented, for example, by a motor, an inverter, and a battery. In that case, the power generation apparatus 918 can supply electric power from the battery to the motor via the inverter on the basis of a control command from the electronic control unit 902, and perform a motor operation (so-called powering) to output positive torque and a regenerative operation to cause the motor to absorb torque to generate electric power, and charge the battery.

The braking apparatus 920 is an apparatus for providing braking force to the vehicle, or causing the vehicle to decelerate or stop. The braking apparatus 920 can include, for example, a brake installed at each wheel, and a brake pipe for transmitting the force of stepping on the brake pedal to the brake, an electronic circuit or the like. In addition, the braking apparatus 920 may include a control apparatus such as an antilock brake system (ABS) or an electronic stability control (ESC) for activating a mechanism of preventing a slide or a skid caused by brake control.

The steering 922 is an apparatus for controlling the advancing direction (steering angle) of the vehicle. The steering 922 can include, for example, a steering wheel, a steering shaft, a steering gear, a tie rod, and the like. In addition, the steering 922 can include a power steering for assisting a driver in steering. Further, the steering 922 can include a power source such as a motor for allowing for automatic steering.

The lamp activation apparatus 924 is an apparatus that activates various lamps such as a head light, a turn signal, a position lamp, a fog light, or a stop lamp. The lamp activation apparatus 924 controls, for example, the blinking of the lamps, the amount of light, the light-emitting direction, or the like.

Note that the power generation apparatus 918, the braking apparatus 920, the steering 922, and the lamp activation apparatus 924 may come into operation on the basis of a manual operation performed by a driver or on the basis of an automatic operation performed by the electronic control unit 902.

6. Conclusion

The above describes an embodiment of the present disclosure in detail with reference to FIGS. 1 to 11. As described above, the information processing system according to an embodiment of the present disclosure makes it possible to provide a more appropriate vehicle insurance by selecting a vehicle insurance in accordance with the current situation.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to make a computer program for causing hardware such as the CPU, the ROM, and the RAM built in the insurance selection server 2 to implement the function of the insurance selection server 2. In addition, there is also provided a computer-readable storage medium having the computer program stored therein.

In addition, insurance fee calculation processing by the insurance provider servers 3 may be executed by the insurance selection server 2.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

a selection section configured to select an insurance to be applied to a vehicle from one or more insurances calculated on a basis of a set vehicle insurance condition, attribute information of the vehicle and a user, and real-time characteristic information of the vehicle which includes movement route information.

(2)

The information processing apparatus according to (1), in which the selection section selects one or more insurances on a basis of an insurance fee of each of the calculated insurances.

(3)

The information processing apparatus according to (2), in which the selection section uses a bidding price decision technique to select the insurance.

(4)

The information processing apparatus according to any one of (1) to (3), in which the selection section makes a selection from insurances presented by insurance start time.

(5)

The information processing apparatus according to any one of (1) to (4), in which the insurance calculates insurances in accordance with the real-time characteristic information detected from the vehicle, and the selection section selects a next insurance from the insurances calculated again.

(6)

The information processing apparatus according to any one of (1) to (5), further including:

a transmission section configured to transmit information regarding the selected insurance for presentation to a user.

(7)

The information processing apparatus according to any one of (1) to (6), in which the attribute information of the vehicle includes an ID for identifying the vehicle, and a car type, and the attribute information of the user includes an ID for identifying the user, and age.

(8)

The information processing apparatus according to any one of (1) to (7), in which the real-time characteristic information of the vehicle includes information regarding a user who is a driver, information regarding an occupant, information regarding a vehicle inside environment, information regarding motion of the vehicle, information regarding a vehicle outside environment, or information regarding a traveling plan of the vehicle.

(9)

The information processing apparatus according to any one of (1) to (8), in which the vehicle insurance condition is a condition regarding a limit of an insurance fee, and minimum compensation coverage.

(10)

The information processing apparatus according to any one of (1) to (7), further including:

a calculation section configured to calculate an insurance on the basis of the vehicle insurance condition, the attribute information of the vehicle and the passenger, and the real-time characteristic information of the vehicle which includes the movement route information.

(11)

The information processing apparatus according to (10), in which the calculation section calculates the insurance with reference to a prediction result of at least any of real-time accident probability or an indemnity calculated on a basis of the real-time characteristic information.

(12) The information processing apparatus according to (10) or (11), in which
the real-time characteristic information of the vehicle includes information regarding automated driving, and
the calculation section calculates the insurance with reference to the information regarding automated driving.

(13) An information processing method including:
selecting, by a processor, an insurance to be applied to a vehicle from one or more insurances calculated on a basis of a set vehicle insurance condition, attribute information of the vehicle and a user, and real-time characteristic information of the vehicle which includes movement route information.

(14) A program for a computer to function as:
a selection section configured to select an insurance to be applied to a vehicle from one or more insurances calculated on a basis of a set vehicle insurance condition, attribute information of the vehicle and a user, and real-time characteristic information of the vehicle which includes movement route information.

(15) An information processing system including:
a calculation section configured to calculate an insurance on a basis of a vehicle insurance condition, attribute information of a vehicle and a user, and real-time characteristic information of the vehicle which includes movement route information; and
a selection section configured to select an insurance to be applied to the vehicle from the calculated one or more insurances.

REFERENCE SIGNS LIST 2 insurance selection server
20 control section
201 selection section
202 communication control section
21 communication section
22 user/vehicle information DB
23 vehicle insurance condition storage section
24 vehicle sensor information DB 24
3 (3A to 3C) insurance provider server
30 control section
301 insurance fee calculation section
302 communication control section
31 communication section
32 storage section
10 vehicle
11 user terminal

The invention claimed is:

1. An information processing apparatus comprising a memory storing a plurality of instructions and circuitry, responsive to the instructions stored in the memory, configured to:
collect real-time vehicle information from one or more sensors of a vehicle, the real-time vehicle information collected by the one or more sensors including information regarding a motion of the vehicle and vehicle outside environment, the information regarding the motion of the vehicle collected by the one or more sensors including a position, velocity, and advancing direction of the vehicle and operation values regarding an accelerator, a brake, and a steering, the vehicle outside environment collected by the one or more sensors including a position, velocity, and advancing direction of a nearby vehicle and a position, velocity, and advancing direction of a nearby pedestrian;
display one or more insurances to an operator of the vehicle on a basis of a set vehicle insurance condition, attribute information of the vehicle and a user, the real-time vehicle information, and a traveling plan that includes a departure place, a departure time, a destination, and a planned traveling route between the departure place and destination;
alter the traveling plan based on a prediction of accident probability and accident damage;
select an insurance to be applied to the vehicle from one or more insurances calculated on a basis of the set vehicle insurance condition, the attribute information of the vehicle and the user, the real-time vehicle information, and the altered traveling plan;
acquire a danger degree rating of each of a plurality of nearby vehicles in closest proximity to the vehicle, the danger degree rating of each of the nearby vehicles being determined based on a predicted real-time accident probability with the corresponding nearby vehicle and insurance purchase information and insurance coverage for the corresponding nearby vehicle; and
display the acquired danger degree rating for each of the nearby vehicles to the operator of the vehicle, each danger degree rating being displayed according to a position of the nearby vehicles relative to the vehicle.

2. The information processing apparatus according to claim 1, wherein the circuitry is further configured to select one or more insurances on a basis of an insurance fee of each of the calculated insurances.

3. The information processing apparatus according to claim 2, wherein the circuitry is further configured to use a bidding price decision technique to select the insurance.

4. The information processing apparatus according to claim 1, wherein the circuitry is further configured to make a selection from insurances presented by insurance start time.

5. The information processing apparatus according to claim 1, wherein the circuitry is further configured to calculate insurances in accordance with the real-time characteristic information detected from the vehicle, and
select a next insurance from the calculated insurances.

6. The information processing apparatus according to claim 1, wherein the circuitry is further configured to transmit information regarding the selected insurance for presentation to a user.

7. The information processing apparatus according to claim 1, wherein
the attribute information of the vehicle includes an ID for identifying the vehicle, and a car type, and
the attribute information of the user includes an ID for identifying the user, and age.

8. The information processing apparatus according to claim wherein the real-time vehicle information of the vehicle further includes information regarding a user who is a driver, information regarding an occupant, or information regarding a vehicle inside environment.

9. The information processing apparatus according to claim 1, wherein
the vehicle insurance condition is a condition regarding a limit of an insurance fee, and minimum compensation coverage.

10. The information processing apparatus according to claim 1, wherein the circuitry is further configured to calculate an insurance on the basis of the vehicle insurance condition, the attribute information of the vehicle and the passenger, and the real-time vehicle information.

11. The information processing apparatus according to claim 10, wherein the circuitry is further configured to calculate the insurance with reference to a prediction result of at least any of real-time accident probability or an indemnity calculated on a basis of the real-time vehicle information.

12. The information processing apparatus according to claim 10, wherein the real-time vehicle information includes information regarding automated driving, and wherein the circuitry is further configured to calculate the insurance with reference to the information regarding automated driving.

13. An information processing method performed by an information processing apparatus comprising a plurality of instructions to perform the information processing method and a processor, responsive to the instructions store in the memory, configured to perform the information processing method, the method comprising:
- collecting real-time vehicle information from one or more sensors of a vehicle, the real-time vehicle information collected by the one or more sensors including information regarding a motion of the vehicle and vehicle outside environment, the information regarding the motion of the vehicle collected by the one or more sensors including a position, velocity, and advancing direction of the vehicle and operation values regarding an accelerator, a brake, and a steering, the vehicle outside environment collected by the one or more sensors including a position, velocity, and advancing direction of a nearby vehicle and a position, velocity, and advancing direction of a nearby pedestrian;
- displaying, by the processor, one or more insurances to an operator of the vehicle calculated on a basis of a set vehicle insurance condition; attribute information of the vehicle and a user, the real-time vehicle information, and a traveling plan that includes a departure place, a departure time, a destination, and a planned traveling route between the departure place and destination;
- altering the traveling plan based on a prediction of accident probability and accident damage;
- selecting an insurance to be applied to the vehicle from one or more insurances calculated on a basis of the set vehicle insurance condition, the attribute information of the vehicle and the user, the real-time vehicle information, and the altered traveling plan;
- acquiring a danger degree rating of each of a plurality of nearby vehicles in closest proximity to the vehicle, the danger degree rating of each of the nearby vehicles being determined based on a predicted real-time accident probability with the corresponding nearby vehicle and insurance purchase information and insurance coverage for the corresponding nearby vehicle; and
- displaying the acquired danger degree rating for each of the nearby vehicles to the operator of the vehicle each danger degree rating being displayed according to a position of the nearby vehicles relative to the vehicle.

14. A non-transitory, computer-readable medium storing instructions that, when executed by a processor in the computer, control the computer to implement a method comprising:
- collecting real-time vehicle information from one or more sensors of a vehicle, the real-time vehicle information collected by the one or more sensors including information regarding a motion of the vehicle and vehicle outside environment, the information regarding the motion of the vehicle collected by the one or more sensors including a position, velocity, and advancing direction of the vehicle and operation values regarding an accelerator, a brake, and a steering, the vehicle outside environment collected by the one or more sensors including a position, velocity, and advancing direction of a nearby vehicle and a position, velocity, and advancing direction of a nearby pedestrian;
- displaying, by the processor, one or more insurances to an operator of the vehicle calculated on a basis of a set vehicle insurance condition, attribute information of the vehicle and a user, the real-time vehicle information, and a traveling plan that includes a departure place, a departure time, a destination, and a planned traveling route between the departure place and destination;
- altering the traveling plan based on a prediction of accident probability and accident damage;
- selecting an insurance to be applied to the vehicle from one or more insurances calculated on a basis of the set vehicle insurance condition, the attribute information of the vehicle and the user, the real-time vehicle information, and the altered traveling plan;
- acquiring a danger degree rating of each of a plurality of nearby vehicles in closest proximity to the vehicle, the danger degree rating of each of the nearby vehicles being determined based on a predicted real-time accident probability with the corresponding nearby vehicle and insurance purchase information and insurance coverage for the corresponding nearby vehicle; and
- displaying the acquired danger degree rating for each of the nearby vehicles to the operator of the vehicle, each danger degree rating being displayed according to a position of the nearby vehicles relative to the vehicle.

15. An information processing apparatus comprising a memory storing a plurality of instructions and circuitry, responsive to the instructions stored in the memory, configured to:
- collect real-time vehicle information from one or more sensors of a vehicle, the real-time vehicle information collected by the one or more sensors including information regarding a motion of the vehicle and vehicle outside environment, the information regarding the motion of the vehicle collected by the one or more sensors including a position, velocity, and advancing direction of the vehicle and operation values regarding an accelerator, a brake, and a steering, the vehicle outside environment collected by the one or more sensors including a position, velocity, and advancing direction of a nearby vehicle and a position, velocity, and advancing direction of a nearby pedestrian;
- calculate one or more insurances to be applied to the vehicle on a basis of a vehicle insurance condition, attribute information of a vehicle and a user, the real-time vehicle information; and a traveling plan that includes a departure place, a departure time, a destination, and a planned traveling route between the departure place and destination;
- receive an altered traveling plan based on a prediction of accident probability and accident damage;
- receive a selection of an insurance to be applied to the vehicle from the calculated one or more insurances calculated on a basis of the set vehicle insurance condition, the attribute information of the vehicle and the user, the real-time vehicle information, and the altered traveling plan;

determine a danger degree rating of each of a plurality of nearby vehicles in closest proximity to the vehicle; the danger degree rating of each of the nearby vehicles being determined based on a predicted real-time accident probability with the corresponding nearby vehicle and insurance purchase information and insurance coverage for the corresponding nearby vehicle;

transmit the acquired danger degree rating for each of the nearby vehicles for display to an operator of the vehicle, each danger degree rating being displayable to the operator of the vehicle according to a position of the nearby vehicles relative to the vehicle.

16. The information processing apparatus according to claim 1, wherein the circuitry is further configured to:
present a plurality of selected automobile insurances to a, user; and
receive from a user an indication of an approved automobile insurance from the plurality of selected automobile insurances.

17. The information processing apparatus according to claim 1, wherein the circuitry is further configured to present to a user a plurality of insurance fees, each insurance fee corresponding to a respective one of a plurality of consecutive time periods, wherein an insurance fee for a first time period is different than an insurance fee for at least one other time period.

* * * * *